(12) United States Patent
Oh et al.

(10) Patent No.: US 12,014,413 B2
(45) Date of Patent: Jun. 18, 2024

(54) METHOD, ELECTRONIC DEVICE, AND NON-TRANSITORY COMPUTER-READABLE STORAGE MEDIUM FOR PROVIDING INFORMATION AND ELECTRONIC DEVICE USING THE SAME

(71) Applicant: Coupang Corp., Seoul (KR)

(72) Inventors: Hye Jin Oh, Seoul (KR); Yeo Joo Yang, Seoul (KR); Seon Il Kim, Seoul (KR); Hae Yeon Lee, Seoul (KR); Hyun Hee Ahn, Seoul (KR); Jung Yeon Nam, Seoul (KR); Ju An Hwang, Seoul (KR); Ji Won Ahn, Seoul (KR); Kun Soo Han, Seoul (KR); Woong Jin Jung, Seoul (KR)

(73) Assignee: Coupang Corp., Seoul (KR)

( * ) Notice: Subject to any disclaimer, the term of this patent is extended or adjusted under 35 U.S.C. 154(b) by 44 days.

(21) Appl. No.: 17/565,207

(22) Filed: Dec. 29, 2021

(65) Prior Publication Data
US 2023/0034443 A1   Feb. 2, 2023

(30) Foreign Application Priority Data
Jul. 30, 2021   (KR) ........................ 10-2021-0101000

(51) Int. Cl.
  *G06Q 30/00*   (2023.01)
  *G06Q 30/0601*   (2023.01)
(52) U.S. Cl.
  CPC ................................ *G06Q 30/0635* (2013.01)
(58) Field of Classification Search
  CPC .................................................. G06Q 30/0635
  USPC ........................................................ 705/26.81
  See application file for complete search history.

(56) References Cited

U.S. PATENT DOCUMENTS

| | | | |
|---|---|---|---|
| 11,244,299 B1 * | 2/2022 | Pittack | G06Q 20/3224 |
| 11,308,536 B1 * | 4/2022 | Adler | G06Q 10/083 |
| 2016/0225046 A1 | 8/2016 | Chang | |
| 2018/0197168 A1 * | 7/2018 | Belemlih | G06Q 10/0833 |
| 2019/0108476 A1 | 4/2019 | Rivalto et al. | |

(Continued)

FOREIGN PATENT DOCUMENTS

| | | |
|---|---|---|
| CN | 106257515 A | 12/2016 |
| CN | 107093049 A | 8/2017 |

(Continued)

OTHER PUBLICATIONS

Redman, R. (2019). Kroger pilots 30-minute grocery delivery. Supermarket News, Retrieved from https://www.proquest.com/trade-journals/kroger-pilots-30-minute-grocery-delivery/docview/2242710634/se-2 (Year: 2019).*

(Continued)

*Primary Examiner* — Arielle E Weiner
(74) *Attorney, Agent, or Firm* — Banner & Witcoff, Ltd.

(57) ABSTRACT

A method of providing information in an electronic device according to various embodiments of the present disclosure may include obtaining an order request from a customer, displaying item list information, order progress information and order money amount information on a first page based on the order request, obtaining information on a partial cancellation of the order request, and updating and displaying the item list information and the order money amount information on the first page based on the information on the partial cancellation.

16 Claims, 15 Drawing Sheets

(56) References Cited

U.S. PATENT DOCUMENTS

| | | | |
|---|---|---|---|
| 2020/0302385 A1 | 9/2020 | Rehn et al. | |
| 2020/0342525 A1* | 10/2020 | Rajkhowa | G06Q 30/08 |
| 2020/0349575 A1* | 11/2020 | Karmakar | G06F 17/15 |
| 2021/0109941 A1* | 4/2021 | Canel Lopez | G06Q 30/01 |
| 2021/0142391 A1* | 5/2021 | van Horne | G06F 3/0482 |
| 2021/0182784 A1 | 6/2021 | Minh et al. | |
| 2021/0256472 A1* | 8/2021 | Javidan | G07C 9/00896 |
| 2021/0295260 A1* | 9/2021 | Silverstein | H04W 4/35 |
| 2022/0092535 A1* | 3/2022 | Silverstein | G06Q 10/08345 |
| 2022/0318896 A1* | 10/2022 | Stanovnov | G06Q 10/087 |

FOREIGN PATENT DOCUMENTS

| | | | |
|---|---|---|---|
| CN | 112465528 A | 3/2021 | |
| CN | 112734527 A | 4/2021 | |
| JP | 2001-315967 A | 11/2001 | |
| JP | 2019530935 A | 10/2019 | |
| JP | 2020191073 A | 11/2020 | |
| JP | 2021515289 A | 6/2021 | |
| KR | 10-2005-0097052 A | 10/2005 | |
| KR | 101141363 B1 | 5/2012 | |
| KR | 101437878 B1 | 9/2014 | |
| KR | 10-2016-0119681 A | 10/2016 | |
| KR | 101708572 B1 | 2/2017 | |
| KR | 10-2017-0079143 A | 7/2017 | |
| KR | 10-2018-0000073 A | 1/2018 | |
| KR | 102100592 B1 | 4/2020 | |
| KR | 10-2020-0111091 A | 9/2020 | |
| KR | 102158797 B1 | 9/2020 | |
| TW | 202125395 A | 7/2021 | |

OTHER PUBLICATIONS

Nov. 29, 2021—Office Action in KR App 10-2021-0101000.
NPL—Internet Blog Sold Out Function Teaching—Cooperative Fresh Merchant Uber blog (https://www.uber.com/zh-TW/blog/grocery-ooi <https://protect-us.mimecast.com/s/2TcpCKrAOGUDgNxpFpAh6a>)—Apr. 9, 2021, machine translation.
NPL—Youtube Merchant Partner Exclusive Channel UberEats_Mobile Teaching by order (https://www.youtube.com/watch?v=ruUcOedyUg8&ab_channel=UberEats%E5%95%86%E5%AE%B6%E5%90%88%E4%BD%9C% <https://protect-us.mimecast.com/s/ZzfjCM87jXU2K1VmTGiEi2>)—May 24, 2021, machine translation.
Jul. 6, 2020 Commerce Design Staff Blog, machine translation.

* cited by examiner

FIG. 6A 4 minutes left — Expected arrival at 11:25 AM
Order modification-Partial cancellation

- ⊘ Receive an Order — 10:25 AM
- ⊘ Order on Preparation — 10:25 AM
- ⊙ On Delivery — 10:25 AM
- ○ Delivery Completed Courier Kim — Call
Scooter delivery Address of Destination Song-Pa Ku, Seoul Put it in front of door Order B9103A Delivery Item List

| | |
|---|---|
| 1. Apple 500g × 2 | ₩25,900 |
| Sum | ₩25,900 |
| Delivery cost | ₩0 |
| Coupon Discount | -₩500 |
| Total Amount or Money | ₩25,400 |

Canceled Item List

1. Bottled Water 500ml × 1 — ₩5,900
   Canceled by Customer
2. Milk 500ml × 3 — ₩9,900
   Canceled by Store / Out of Stock

| | |
|---|---|
| Sum | ₩15,800 |
| Collecting Cost | ₩200 |
| Refund Money Amount | ₩16,000 |

FIG. 10A

× Delivery Status Information

May 11, 2020  Delivery completed
Order modification-
partial cancellation

⊙ Receive Order          10:25 AM
⊙ Order on Preparation   10:25 AM
⊙ On Delivery            10:25 AM
⊙ Delivery Completed     10:25 AM Address of Destination Song-Pa Ku, Seoul Put it in front of door Order B9103A Delivery Item List 1. Apple 500g × 2         ₩25,900

Sum                       ₩25,900
Delivery cost                 ₩0
Coupon Discount            -₩500
Total Amount of Money     ₩25,400

Canceled Item List

1. Bottled Water 500ml × 1   ₩5,900
   Canceled by Customer
2. Milk 500ml × 3             ₩9,900
   Canceled by Store / Out of Stock Sum                       ₩15,800
Collecting Cost              ₩200
Refund Money Amount       ₩16,000

METHOD, ELECTRONIC DEVICE, AND NON-TRANSITORY COMPUTER-READABLE STORAGE MEDIUM FOR PROVIDING INFORMATION AND ELECTRONIC DEVICE USING THE SAME

RELATED APPLICATION INFORMATION

The present application claims priority to and the benefit of Korean Patent Application No. 10-2021-0101000, filed on Jul. 30, 2021, and is incorporated by reference herein in its entirety.

TECHNICAL FIELD

Various embodiments of the present disclosure relate to a method of providing information and an electronic device using the same.

DESCRIPTION OF THE RELATED ART

With the development of devices including smartphones, the number of users using an e-commerce service platform is increasing. In particular, as the center of shopping, which was mainly handled offline, is changed to online, the frequency of ordering items necessary for daily life from an e-commerce service platform is increasing.

As the items handled by the e-commerce service platform diversify and the number of one-person households increases, a service for ordering simple daily necessities is required. When a small amount of daily necessities are urgently needed, the sales of the platform can be increased if the items are quickly delivered and collected by ordering the items or canceling the order after the ordering.

Meanwhile, although Korean Patent No. 10-1708572 discloses a method in which a plurality of customers order an item to be ordered to a designated store, the method relates to a delivery method for a general order and the method dose not disclose a way of delivering and collecting according to a customer's order and cancellation.

DISCLOSURE OF THE INVENTION

Technical Goals

When a customer orders some items and then cancels a part of an order in an e-commerce service platform where purchase of simple daily necessities is also possible, the item sales turnover can be increased if the information on the order and cancellation is provided and thus the delivery and collection are made promptly. In addition, it is possible to reduce the hassle of canceling the ordering of all the items after the customer orders the item and re-performing the purchase process.

In order to solve the above issues, the present disclosure provides a method of providing information to a customer and a courier so that the delivery related to the delivery and collection according to the customer's order request and cancellation request can be quickly processed, and an electronic device using the same.

Technical Solutions

According to various embodiments of the present disclosure, a method of providing information in an electronic device includes obtaining an order request from a customer, displaying item list information, order progress information, and order money amount information on a first page based on the order request, obtaining information on a partial cancellation among the order request, and updating the item list information and the order money amount information based on the partial cancellation information and displaying the information on the first page.

According to various embodiments of the present disclosure, an electronic device includes a database and a processor, wherein the processor obtains an order request from a customer, displays item list information, order progress information, and order money amount information on a first page based on the order request, obtains an information on a partial cancellation among the order request, and updates and displays the item list information and the order money amount information on the first page based on the partial cancellation information.

According to various embodiments of the present disclosure, a non-transitory computer readable storage medium includes a medium configured to store computer-readable instructions, wherein when the computer-readable instructions are executed by a processor, the processor is configured to perform a method of providing information in an electronic device, the method including obtaining an order request from a customer, displaying item list information, order progress information, and order money amount information on a first page based on the order request, obtaining information on a partial cancellation among the order request, and updating and displaying the item list information and the order money amount information on the first page based on the information on the partial cancellation.

Effects

A method of providing information according to various embodiments of the present disclosure provides order-related information obtained by reflecting the information on a cancellation request for an item included in a customer's order request, and provides a faster delivery while providing more accurate information by assigning a courier to the order request and the cancellation request, when obtaining an information about the customer's order request and a cancellation request.

An electronic device according to various embodiments of the present disclosure provides a faster delivery based on a previous order by performing collecting of partially canceled items according to the customer's order request and a partial cancellation without canceling the order for all items included in the order request.

BRIEF DESCRIPTION OF THE DRAWINGS

FIGS. 6A and 6B are exemplary diagrams of information provided during a delivery of an order according to various embodiments of the present disclosure.

FIGS. 10A and 10B are exemplary diagrams of information provided after a delivery of an order is completed according to various embodiments of the present disclosure.

DETAILED DESCRIPTION FOR CARRYING OUT THE INVENTION

Figure 1:
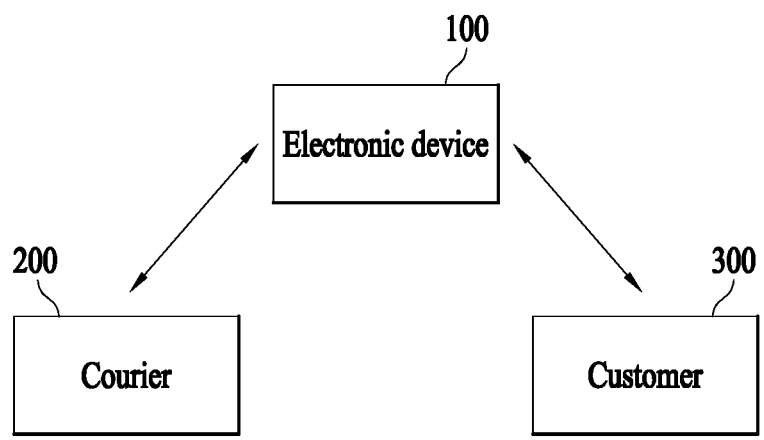
FIG. 1 is a block diagram of apparatuses for providing information according to various embodiments of the present disclosure.

Terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may indicate the following meaning including: A alone; B alone; C alone; both A and B together; both A and C together; both B and C together; or all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, embodiments of the present disclosure will be described with reference to the drawings.

In describing the embodiments, descriptions of technical contents that are well known in the art to which the present disclosure belongs and are not directly related to the present specification will be omitted. This is to more clearly communicate without obscure the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following embodiments that will be described in more detail with reference to the accompanying drawings. It should be noted, however, that the present disclosure is not limited to the following embodiments, and may be implemented in various forms. Accordingly, the embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

FIG. 1 is a block diagram of apparatuses for providing information, according to various embodiments of the present disclosure.

Referring to FIG. 1, an electronic device 100, a courier 200, and a customer 300 may send and receive data to and from different nodes, respectively, and such nodes may be connected through a network.

The electronic device 100 may be a device such as a server of a platform that sells items, a server that manages a distribution center that manages inventory of items and assigns a delivery of items, an integrated server of an item sales system, or an item sales management server. Although the electronic device 100 may include a processor, a transceiver, a database, and the like as internal components, the present disclosure is not limited thereto. The processor of the electronic device 100 may process a series of operations for performing the method of providing information according to various embodiments of the present disclosure. The processor may control other components of the electronic device 100.

The transceiver of the electronic device 100 may perform a function of transmitting information stored in the database of the electronic device 100 or information processed by the processor to another device, or receiving information from another device to the electronic device 100.

The database of the electronic device 100 is a data structure implemented in a predetermined storage space of the electronic device 100, and functions such as storing, searching for, deleting, editing, or adding data may be freely performed on the database. For example, a database may include fields or components for processing functions such as storage, retrieval, deletion, editing, or addition of data.

The electronic device 100 may operate or manage the platform (hereinafter, 'platform') through a program (e.g., software, application, etc.) that integrally performs an order process on the platform. In detail, the program (hereinafter, 'program') may be executed by the electronic device 100, the courier 200, and the customer 300, respectively. Portions of the program may be executed on separate devices, and other portions may be executed on other devices. Various operations, analyses, and operations performed by or using the program may be executed by portions of the program independently or cooperatively, and may be performed by one or more computers, controllers, or other devices as the electronic device 100, the courier 200, and the customer 300.

The courier 200 may perform an input for receiving information from the electronic device 100 or may mean a terminal possessed by a courier who receives information from the electronic device 200. The courier 200 may mean a person who is registered on the platform and performs the delivery according to an order request, and delivery means registered for delivery may be different for each courier 200. In this specification, the courier 200 will be described as devices such as a smartphone, a tablet, and a PC, which are terminals possessed by the courier.

The customer 300 may perform an input for receiving information from the electronic device 100 or may mean a terminal possessed by a customer who receives information from the electronic device 200. In this specification, the customer 300 will be described as devices possessed by the customer, such as a smart phone, a tablet, and a PC.

The network may refer to a structure in which data is transmitted or received between nodes of each of a plurality of devices and servers. Examples of networks may include RF, LTE (Long Term Evolution) network, 5G network, Internet, LoRa network, LAN (Local Area Network), wireless LAN, WAN (Wide Area Network), Bluetooth network, NFC network, etc. and may not be limited thereto.

Figure 2:
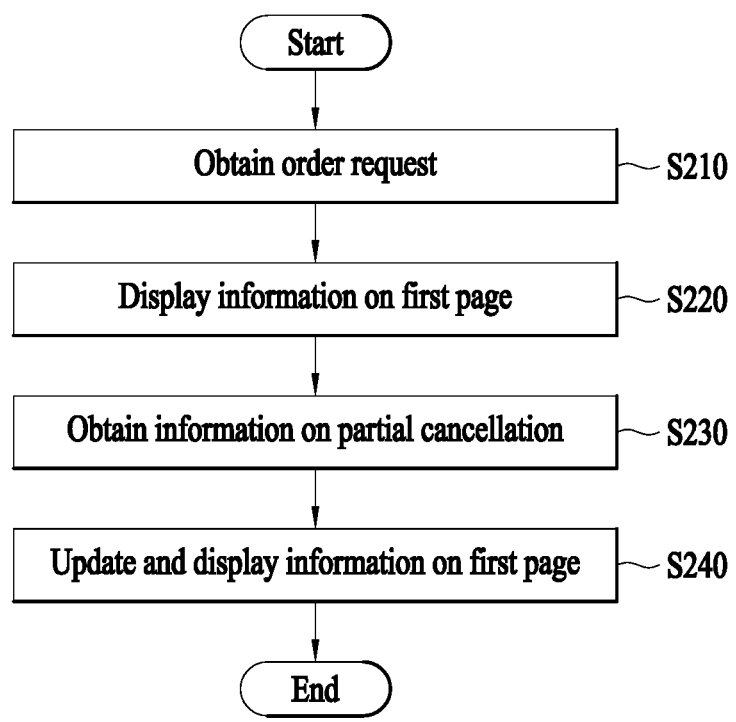
FIG. 2 is a schematic flowchart of a method for providing information according to various embodiments of the present disclosure.

FIG. 2 is a schematic flowchart of a method for providing information according to various embodiments of the present disclosure.

FIG. 2 is a flowchart representing the process of providing a list of items included in an order and cancellation information on some of the ordered items, etc. in response to an order request from a customer (e.g., the customer 300 of FIG. 1), and updating, displaying, and providing the information that is changed.

Operation S210 is an operation of obtaining an order request from the customer. A customer may use an electronic device (e.g., the electronic device 100 of FIG. 1) to perform a request to order an item from an operating or managed item sales platform. The customer's order request may correspond to an order to purchase an item, an order to deliver food, and the like. A customer can access the platform using a terminal possessed by the customer, create an order and request the order. The customer's order request may be to create a list and input an order to purchase an item in the program. Specifically, the electronic device may obtain the order request generated by the customer, and this may be performed by a program that is a kind of software (or application) through which the order process of the platform is performed.

Operation S220 is an operation of displaying various information on a first page based on the customer's order request. The information based on the order request may include item list information, order progress information and order money amount order money amount information. Specifically, the item list information may be the information on the list of items included in the customer's order request, the order progress information may be the information on the customer's order progress (e.g., in delivery), and the order money amount order money amount information may be the amount of money of each item ordered and a total amount of money. The first page may be a page displayed on a program. For example, the page may be a page where the details of an order currently in progress or completed can be confirmed.

Operation S230 is an operation of obtaining a cancellation of some of the customer's order requests. A cancellation for a part means a partial cancellation, and may include, for example, a cancellation after an order completion (e.g., delivery completion, purchase confirmation, etc.) and a cancellation before order completion after an order request. A partial cancellation of S230 may be a cancellation before order completion after an order request. The customer may cancel at least some of the ordered items after the order request, and the electronic device may obtain information about the partial cancellation. Information on a partial cancellation may be obtained based on at least one of item inventory information of a store (hereinafter, 'store') corresponding to an order request and a cancellation request of a customer. The store corresponding to the order request may be, for example, a store operated or managed by an electronic device that is close to the customer through location information or delivery address information. Specifically, the store may be a warehouse, a distribution center, etc., in which items being sold on the platform can be picked up according to a customer's order request through a courier (e.g., the courier 200 of FIG. 1).

Operation S240 is an operation of updating and displaying various information based on information on a partial cancellation of an order request. Various information to be updated may be, for example, item list information and order money amount order money amount information. Specifically, the updated item list information may include information on the item list canceled according to a partial cancellation, and information on reasons for a cancellation of the canceled item. More specifically, the information of the canceled item list may be information in which cancellation marks (e.g., strikethrough marks on item information) are marked on items canceled due to information on a partial cancellation in item list information according to a customer's order request. More specifically, the cancellation reason information for the canceled item may be information explaining the reason for which the item according to the customer's order request is out of stock because the store has no inventory, or explaining the reason for which the customer makes a cancellation request. When the electronic device updates and displays the order request and information on a partial cancellation of the order request on the first page, the information may be updated and provided in the customer's terminal by the program.

Figure 3:
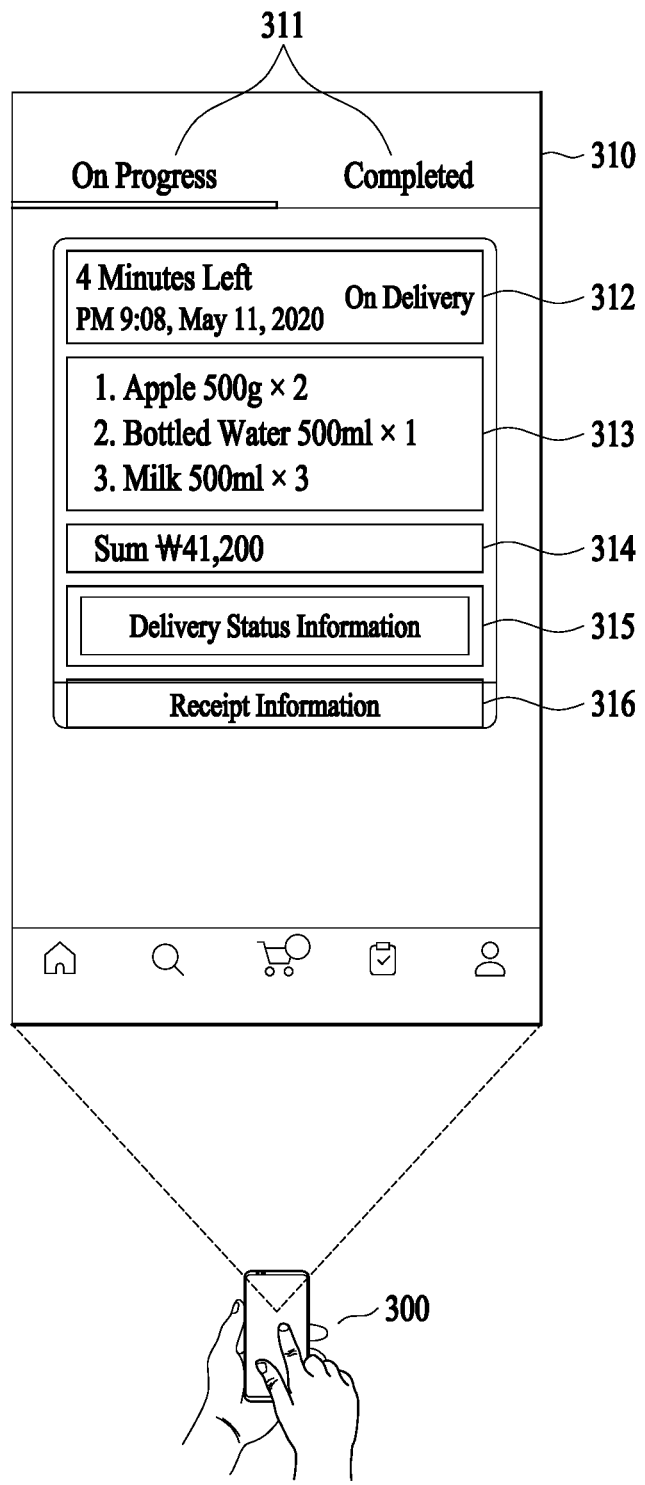
FIG. 3 is an exemplary diagram of a page confirmed by a customer who has been provided with order-related information according to various embodiments of the present disclosure.

FIG. 3 is an exemplary diagram of a page that a customer who has been provided with order-related information confirms according to various embodiments of the present disclosure.

FIG. 3 may be an example of the first page on which information provided to the customer 300 according to an order request from the customer 300 is displayed. An example of the enlarged screen shown in FIG. 3 may be an example of the enlarged first page 310 provided on the display of the terminal possessed by the customer 300.

The first page 310 may be a page for confirming details of an order currently in progress or completed. Referring to FIG. 3, the first page 310 provided to the customer 300 and being confirmed is a page for an order currently in progress, and a status 311 of the order according to the order request can be confirmed in an individual tab. For example, information according to the order request may be provided in the expression 'in progress' tab of the first page 310 until the order is completed after the order request is obtained and the delivery is completed. As another example, after the order according to the order request is completed, an information according to the order request may be provided in the 'completion' tab of the first page 310.

According to various embodiments, order progress information 312, item list information 313 and order money amount order money amount information 314 may be displayed on the first page 310. A delivery status information area 315 may be an area in which delivery status information can be confirmed in detail, and a receipt information area 316 may be an area in which receipt information according to an order request can be confirmed in detail. Specifically, the region may be a region in which a selection input such as a click is made by the customer 300 to check detailed information. In addition, on the first page 310, the estimated delivery time information determined based on the picking information of the courier (e.g., the courier 200 of FIG. 1) in the store corresponding to the order request and the location information of the courier assigned by the order request may be displayed.

The order progress information 312 may include the information on the time remaining until the order is completed after the delivery of the courier (e.g., the courier 200 of FIG. 1) is completed according to the order request of the customer 300 (e.g., 4 minutes left), the information on an expected delivery time at which delivery will be completed (e.g., 9:08 pm on May 11, 2020), and the information on the current order status (e.g., in delivery). The order progress information 312 may be updated and provided according to the progress of the order, and the information may be updated in a certain period or in real time. Specifically, the estimated delivery time information can be generated by calculating with the algorithm of the platform in consideration of the distance to the delivery destination and the delivery method of the courier, etc., based on the information which the courier assigned to the order request picking the items included in the order request and based on the location information that is changed during delivery by the courier. The algorithm for calculating the estimated delivery time may be formed by synthesizing the accumulated delivery speed according to the delivery means of the courier, a map reflecting the expected delivery route to the delivery destination and the average delivery speed of various couriers.

The item list information 313 may be information on a list of items included in the order request of the customer 300. The order money amount order money amount information 314 may be information on the amount of money of each ordered item and the total amount of money. In FIG. 3, only 'sum', which is the total money amount information, is shown in the order money amount order money amount information 314, but is not limited thereto. In addition, the information on the amount of the individual items ordered may be provided in parallel with the information of the individual items in the item list information 313. For example, the information of 'apple 500 g×2' among the item list information 313 may be provided in parallel with the information on the amount of that item.

Figure 4A:
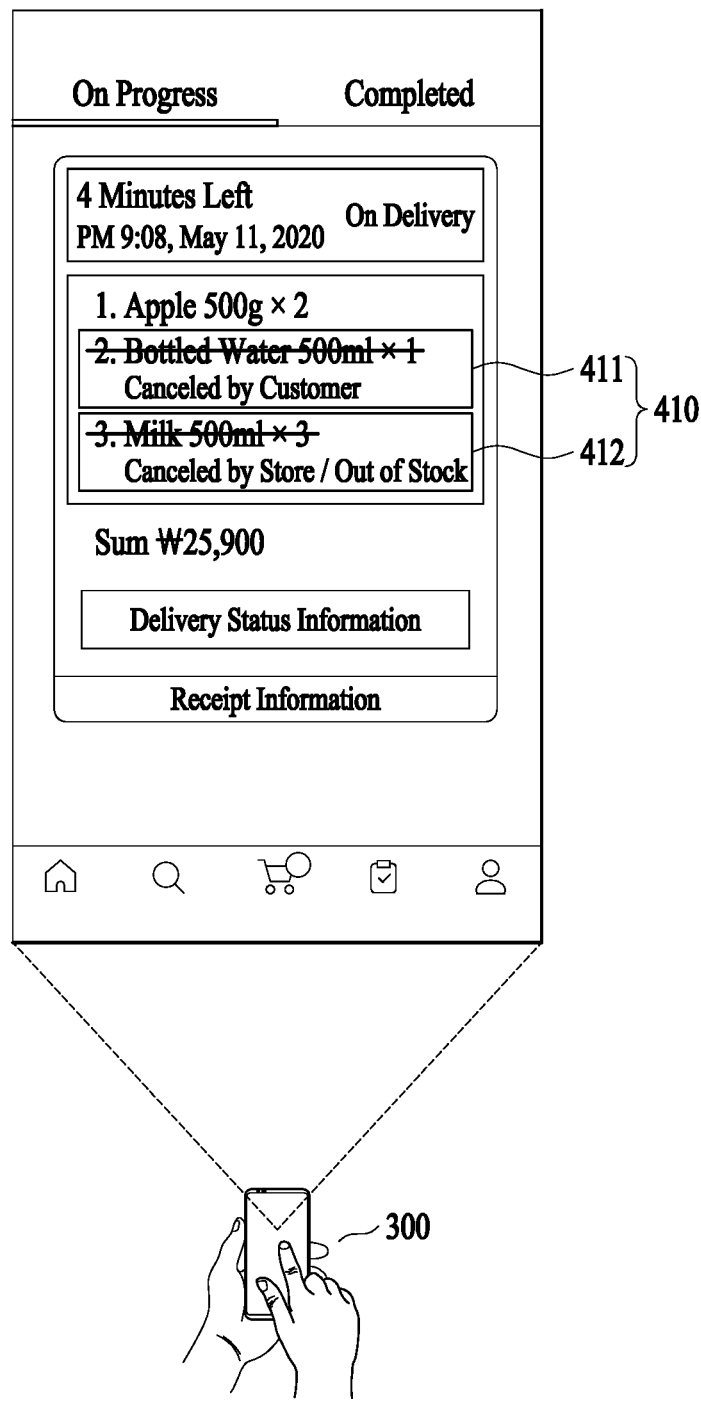
FIGS. 4A to 4C are exemplary diagrams of a page confirmed by a customer who has been provided with information related to cancellation according to various embodiments of the present disclosure.
Figure 4B:
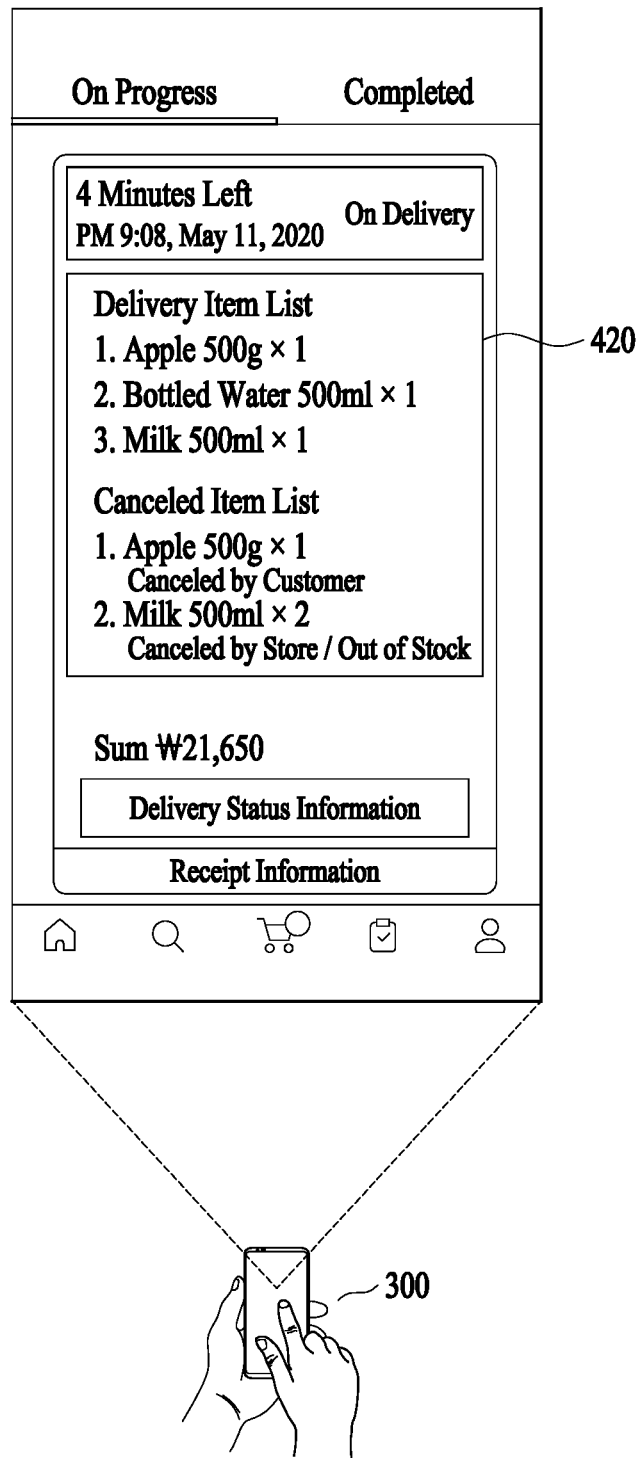
Figure 4C:
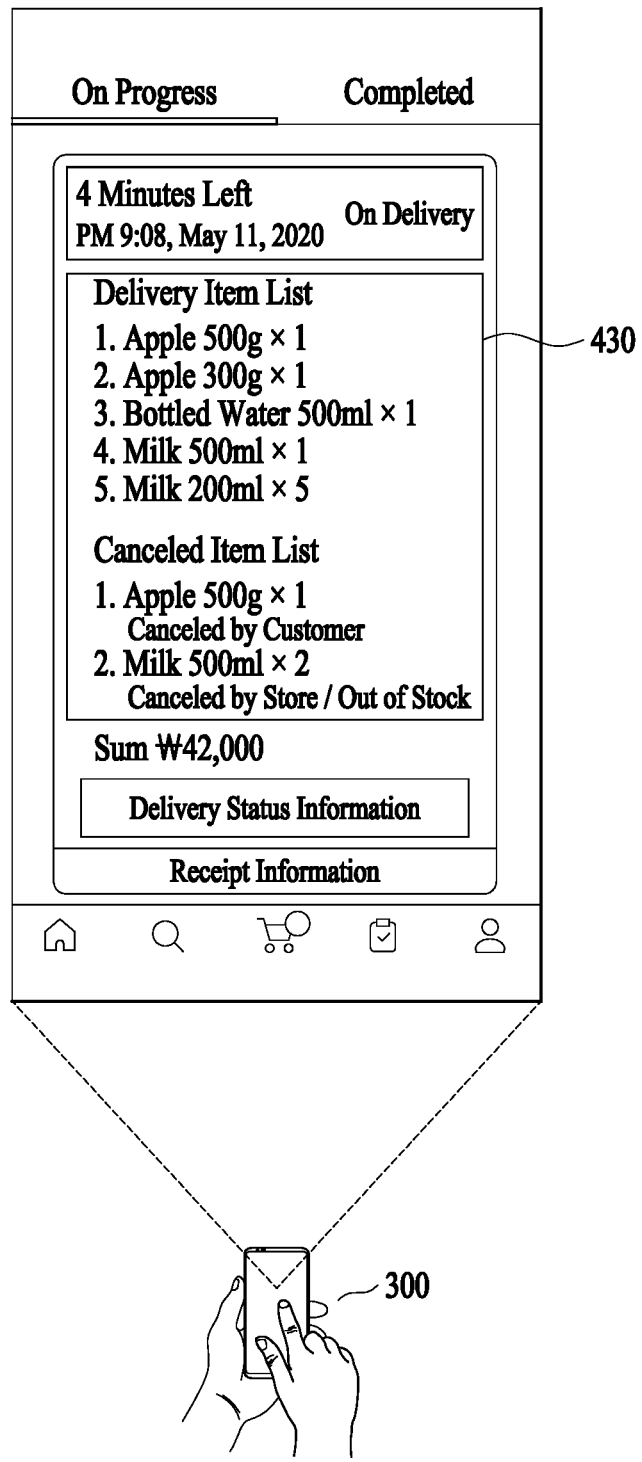

FIGS. 4A to 4C are exemplary diagram of a page confirmed by a customer who has been provided with information related to cancellation according to various embodiments of the present disclosure.

FIGS. 4A to 4C may be an example in which an item list information is updated and displayed according to information on a partial cancellation of an order request from the customer 300. An example of the enlarged screen shown in FIGS. 4A to 4C may be an example of the enlarged first page (e.g., the first page 310 of FIG. 3) provided on the display of the terminal possessed by the customer 300. The example shown in FIGS. 4A to 4C includes displaying the cancellation reason information for the canceled item and this example may be applied to FIGS. 6A and 6B and FIGS. 10A and 10B exemplified herein in the same manner or similarly, but is not limited thereto.

The examples of FIGS. 4A to 4C may correspond to a case in which the delivery is impossible for at least some of the items included in the order request of the customer 300. For example, the electronic device (e.g., the electronic device 100 of FIG. 1) that has obtained the order request may receive information confirming that the item is out of stock, while the courier (e.g., the courier 200 of FIG. 1) picks the ordered item from the store. The electronic device may provide the cancellation reason information to the customer 300 through the service center or the program of the platform, and the customer 300 may receive the items in a partially canceled state or receive the items including replacement items. As another example, the electronic device provides the cancellation reason information on the item included in the order request to an employee working at the service center of the platform, and the service center employee attempts to call the customer 300 to provide the cancellation reason information so that the service center employee can provide a notification of the cancellation reason information and receive a response by asking whether the customer wants to receive the item in a canceled state, to receive the item with a replacement item to replace the canceled item, or to cancel the order request by canceling the entire order. FIGS. 4A to 4C correspond to examples reflecting such a process, and are not limited thereto.

Referring to FIG. 4A, the customer 300 may request a cancellation of at least some of the ordered items before the completion of the order after the order request. The partial cancellation request may be included in the information on the partial cancellation of the order request, and the item canceled according to the cancellation request among the item list information generated based on the order request may be updated and the updated information may be displayed. Specifically, the customer 300 may cancel the ordered item through a cancellation request, and the reason for such cancellation may be displayed in the updated item list information.

The updated item list information may include the information on a partial cancellation, and the information on a partial cancellation may be obtained based on at least one of the inventory information of the store corresponding to the order request and the cancellation request of the customer 300. Specifically, the updated item list information may include the cancellation reason information, and the cancellation reason information 410 may be information explaining what the reason is when the item according to the order request of the customer 300 is out of stock because the store has no inventory or the customer makes a cancellation request. For example, if the store has no inventory because the item is out of stock, the electronic device may provide the customer with information that the item included in the order request is out of stock, thereby allowing the customer to input a cancellation request. The customer performs a cancellation request by inputting a cancellation for the out-of-stock item based on the provided information, and the electronic device may obtain information on the cancellation accordingly, generate and provide the cancellation reason information 410 to the customer.

For example, when the customer 300 requests a cancellation of a part of the ordered items, the cancellation reason 411 by the customer among the cancellation reason information 410 may be displayed. The cancellation reason information 410 may be helpful in determining whether the cancellation is due to the customer 300's intention or the store.

The total amount of money for the item list displayed in FIG. 4A may be an amount of money excluding the amount of money for canceled items. Except for the item canceled by the cancellation reason information 410 from the total amount of money for the item ordered by the customer 300, only the amount of money for the item currently being delivered may be displayed as the total amount or money.

As another example, if the store corresponding to the order request does not have inventory of the item included in the order request, a reason 412 due to the store in the cancellation reason information 410 may be displayed. The reason 412 due to the store may include a case in which, although the inventory of the items included in the order was existed in the electronic data at the time the customer 300's order request was obtained, there is no stock in the actual store, and a case in which, although the inventory was present at the time the customer 300's order request was obtained, the item is damaged and difficult to deliver to the customer 300 when the item is picked by the courier (e.g., the courier 200 of FIG. 1). The present disclosure is not limited to.

FIG. 4B may correspond to an example of the order request item list 420. Referring to FIG. 4B, when there is cancellation of a part of the items included in the order request of the customer 300, the canceled item list may be separately displayed. For example, one of 'apples 500 g×2' may be canceled and displayed as one (1) in the delivery item list and one (1) in the canceled item list, respectively. For example, two (2) out of 'milk 500 ml×3' may be canceled and displayed as one (1) in the delivery item list and two (2) in the canceled item list, respectively. Specifically, a cancellation reason information (e.g., cancellation reason information 410 of FIG. 4A) for which each item is canceled may be additionally displayed in the canceled item list. In addition, information on the total amount of money for the order request item list 420 is also changed to reflect the updated information.

FIG. 4C may correspond to an example of a replacement item list 430. Referring to FIG. 4C, when there is a cancellation of a part of the items included in the order request of the customer 300, the canceled item list is displayed separately, and a replacement item replacing the canceled item is newly included in the delivery item list and can be displayed. This may be a case in which the information including replacement items for the canceled items of the customer 300 is received through a service center or a program. For example, one (1) of 'apples 500 g×2' is canceled and one (1) item is added to the delivery list, one (1) item is added to the canceled item list, and 'Apple 300 g×1' is added as a replacement item to the delivery item list and they may be displayed respectively. For example, two (2) out of 'Milk 500 ml×3' is canceled and one (1) item is added to the delivery item list, two (2) items are added to the canceled item list and 'Milk 200 ml×5' is added to the delivery item list as a replacement and they may be displayed respectively. Such a replacement item for the canceled item is provided to the customer 300 by synthesizing information such as the quantity, capacity, price, brand, etc. of the canceled item, and may be determined according to the acquisition of the replacement request information of the customer 300. Specifically, the replacement item may reflect the inventory status of the store in which the item is picked according to the order request of the customer 300. Specifically, the cancellation reason information (e.g., the cancellation reason information 410 of FIG. 4A) for which each item is canceled may be additionally displayed in the canceled item list. In addition, the information on the total amount of money of the replacement item list 430 is also changed to reflect the updated information.

Figure 5:
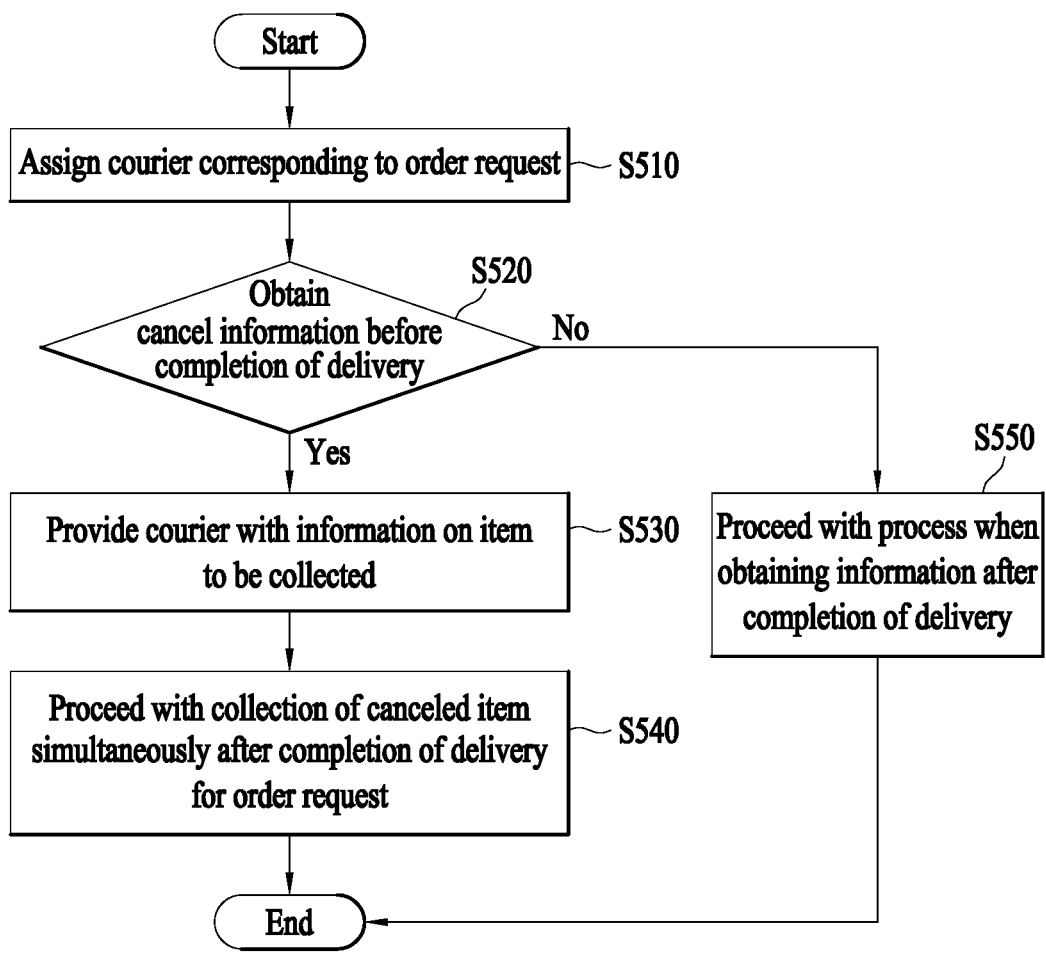
FIG. 5 is a schematic flowchart of an item collecting according to a cancellation during an order request according to various embodiments of the present disclosure.

FIG. 5 is a schematic flowchart of the item collecting according to the cancellation during an order request according to various embodiments of the present disclosure.

FIG. 5 is the flow of the process that the information on a partial cancellation is obtained before order completion after an order request is obtained, and a courier (e.g., the courier 200 of FIG. 1) collects the canceled item as soon as the delivery of the item is completed.

Operation S510 is an operation in which the electronic device (e.g., the electronic device 100 of FIG. 1) acquires an order request and assigns a courier in charge of delivery of the corresponding order. The electronic device may receive the location information of the courier. Also, the electronic device may obtain the location information of a store corresponding to the order request. For example, the electronic device may assign any one of the couriers located within a predetermined distance from the location of the store to delivery for the order based on the location information of the courier. Specifically, when obtaining the order request, the electronic device may assign any one of the couriers not assigned for the delivery job to the delivery job for the order. The predetermined distance may be, for example, within a radius of 1 km from the location of the store, but is not limited thereto.

Operation S520 is an operation of confirming whether the information on a cancellation is obtained before the delivery is completed after obtaining the order request. Confirming whether the information on a cancellation is obtained before the completion of delivery is for branching to operations S530 and S540, and a process including additional restrictions may be performed when the information on cancellation is obtained after the completion of delivery.

Operation S530 is an operation of providing the information on the item to be collected to the courier assigned to the order request. For example, the assigned courier may be provided with the information on a collect request while moving to a delivery destination after picking an item from a store according to an order request. The information on the collection request may be the information in which the electronic device obtains the information on cancellation and requests the courier to collect the canceled item.

Operation S540 is an operation in which the courier collects the canceled item while completing the delivery of the item to the delivery destination. For example, the courier obtains, from the electronic device, the item delivery request information according to the order request of the customer (e.g., the customer 300 in FIG. 1), and may be provided with the collecting request information on at least a part of the items being delivered while delivering the items to the delivery destination. The courier may proceed with the collection of the item for which the collection is requested after the item is delivered to the destination and is canceled at the same time. Specifically, if the courier receives the collecting request information as the cancellation request for the second item while delivering the first item and the second item, the courier may leave the first item delivered to the destination, collect the second item and return to the store. More specifically, the courier may return to the store where the second item was picked and restock the second item into the store. The electronic device may provide the courier with the information on a store where the collected items are to be placed, and may also provide the information to put the items in a store other than the store where the items are originally located.

Operation S550 is an operation of proceeding with a process according to the case in which the information on the cancellation is obtained after the completion of delivery. This will be described with reference to FIGS. 8 and 9.

Figure 6B:
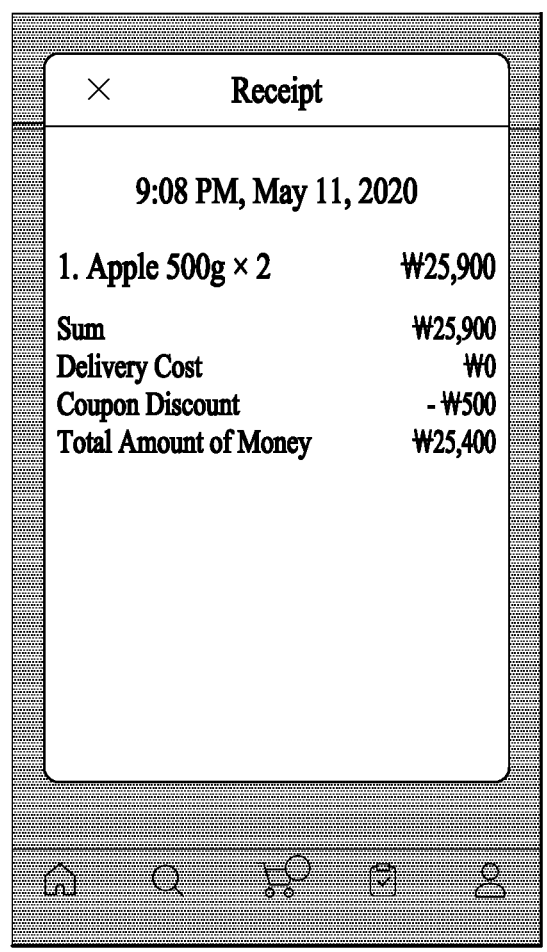

FIGS. 6A and 6B are exemplary diagrams of the information provided during the delivery of an order according to various embodiments of the present disclosure.

FIG. 6A may be an example of a second page provided when an input to a partial region of the first page (e.g., the first page 310 of FIG. 3) is obtained, and FIG. 6B may be an example of a third page provided when an input to a partial region of the first page is obtained.

Referring to FIG. 6A, the second page may be provided according to an input of a partial region of the first page by a customer (e.g., the customer 300 of FIG. 1). The customer may perform an input for selecting the delivery status information area 315 of FIG. 3. The delivery status information area 315 of FIG. 3 is described to be used interchangeably with the first area. The electronic device (e.g., the electronic device 100 of FIG. 1) may obtain a selection input for the first area of the customer and provide detailed delivery status information on the second page according to the input.

The delivery status information provided on the second page may include, in the order from top to bottom, the current delivery location information of the courier assigned in response to the order request, the delivery estimated time information and the order progress information, the registration information of the courier, the information of the delivery destination, the item list information, the cancellation reason information, and the order money amount information, as shown in FIG. 6A.

According to various embodiments, the information on the current delivery location of the courier assigned in response to an order request may be provided as a kind of map-type image. Referring to FIG. 6A, on the map, a person-shaped icon indicates a customer's delivery destination, a house-shaped icon indicates a store where the items are picked, and an icon of a delivery means indicates a current delivery location of the courier.

According to various embodiments, the estimated delivery time information and the order progress information include the information indicating a progress process from the acquisition of a customer's order request to the completion of a delivery. The mark on the left side of the individual order progress becomes a 'v' mark (e.g., receiving an order, preparing an order) for a completed process, and an 'o' mark (e.g., on delivery) for a process that is currently in progress, and there may be no separate indication for the process to be followed (e.g., delivery completed). Such an example is merely an example expressed by the UI and is not limited thereto.

According to various embodiments, the registration information of the courier may include the information such as the name of the courier, the delivery means of the courier, and the phone number of the courier. Customers may be able to contact the courier by the input of selecting 'Call' if the courier's delivery of the item is later than the estimated delivery time.

According to various embodiments, the delivery destination information may include the delivery destination information and the delivery request information input or selected by the customer when requesting an order. The item list information, the cancellation reason information, and the order money amount information may be the information displayed by reflecting the information about a customer's order request and cancellation. If the information on the cancellation is not additionally acquired after obtaining the customer's order request, the information related to the cancellation including the cancellation reason information may not be provided in FIG. 6A.

Referring to FIG. 6B, the third page may be provided according to a customer's input to a partial region of the first page. The customer may perform an input to select the receipt information area 316 of FIG. 3. The receipt information area 316 of FIG. 3 is used interchangeably with the second area. The electronic device may obtain a selection input for the second area of the customer and provide the receipt information in detail on the third page according to the input.

As shown in FIG. 6B, the receipt information provided on the third page may include the information of a time at which an order request is obtained, the item list information, the canceled item list information, and order money amount information.

According to an embodiment, the information on the time at which the order request is obtained may be the information on the time at which the electronic device obtains the order request from the customer. According to another embodiment, the information on the time at which the delivery according to the order is completed may be provided by replacing the information on the time at which the order request is obtained. According to another embodiment, the information on a time at which the delivery is completed and a receipt is issued according to an order request may be provided. As such, the information of the time at which the order request displayed on the third page is obtained may be an example, and other information useful to the customer may be replaced and displayed in the area where the information is displayed.

As for the item list information and the canceled item list information provided on the third page, a strikethrough line is not displayed for items (e.g., apple) that have been delivered and confirmed for the purchase, and a strikethrough line may be displayed for the canceled items (e.g., bottled water, milk).

The order money amount information provided on the third page may include the information on the total amount of money of items ordered at the time of the initial order request, the delivery cost information, the delivery cost discount information, the coupon discount information, the refund information due to the cancellation, and the total amount. Specifically, the electronic device may collectively provide other information that may be included in the order money amount information. For example, if there is no delivery cost discount, the electronic device may not display the delivery cost discount information. As another example, if there is a targeted discount for the customer, the electronic device may additionally display the targeted discount information.

Figure 7:
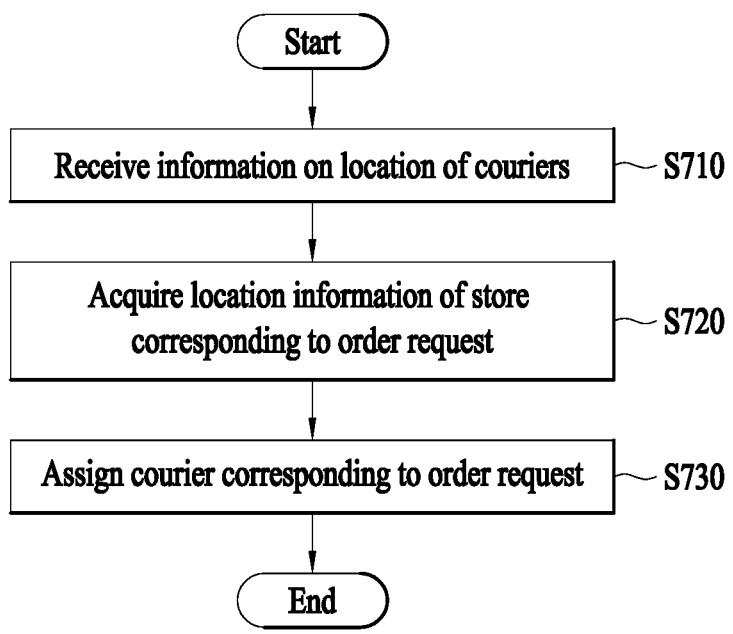
FIG. 7 is a schematic flowchart of a courier allocation according to various embodiments of the present disclosure.

FIG. 7 is a schematic flowchart of the courier allocation according to various embodiments of the present disclosure.

FIG. 7 shows the flow of the assignment process which assigns the courier (e.g., the courier 200 of FIG. 1) to a delivery job according to the order through the location information of a store where an order request of a customer (e.g., the customer 300 of FIG. 1) is to be performed and the location information of the couriers.

Operation S710 is an operation of receiving the location information of the couriers. The electronic device (e.g., the electronic device 100 of FIG. 1) may receive the location information of a courier. The location information of the couriers may be received through the GPS information of a terminal possessed by the couriers, but is not limited thereto.

Operation S720 is an operation of confirming the location of the store corresponding to the order request. The electronic device may obtain the location information of the store corresponding to the order request. The store corresponding to the order request may be a store operated or managed by the electronic device as a store located close to a place as the customer location information or the delivery destination information. Specifically, when a customer orders an item through the program, an order may be made at a store close to the delivery destination through the delivery destination information among the customer information. More specifically, the program assigns a store where an order is made to the customer based on the delivery destination information of the individual customer, and the customer may perform an order request for the item in the assigned store.

Operation S730 is an operation of assigning a courier corresponding to the customer's order request. For example, the electronic device may assign any one of the couriers located within a predetermined distance from the location of the store to delivery for the order based on the location of the courier. Specifically, when obtaining the order request, the electronic device may assign any one of the couriers not assigned for the delivery job to the delivery job for the order. The predetermined distance may be, for example, within a radius of 1 km from the location of the store, but is not limited thereto.

According to another embodiment, the assigning of a courier in operation S730 may be performed by exchanging the information between the electronic device and the courier. After obtaining the order request from the customer, the electronic device may provide the delivery request information to the couriers located within a predetermined distance from the location of the store among the couriers who are not assigned to a delivery job. If any one of the couriers who received the delivery request information provides the delivery acceptance information to the electronic device that the courier will be charge of the delivery, the electronic device may assign the courier who provided the delivery acceptance information to the delivery of the order. Specifically, the courier may be assigned in the order in which the delivery acceptance information arrives first according to the sequence which the device receives the delivery acceptance information.

Figure 8:
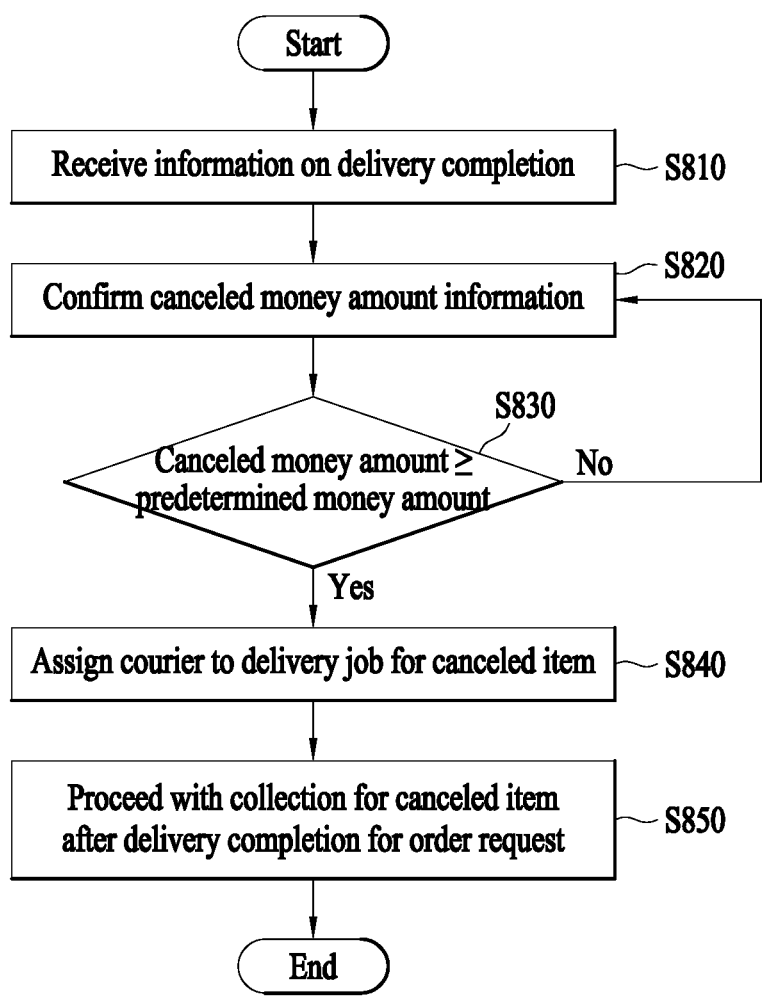
FIG. 8 is a schematic flowchart of an item collecting according to a cancellation after a delivery is completed according to various embodiments of the present disclosure.

FIG. 8 is a schematic flowchart of the item collecting according to the cancellation after the delivery is completed according to various embodiments of the present disclosure.

FIG. 8 may be a flow showing a detailed process for operation S550 of FIG. 5. FIG. 8 shows a process for obtaining the cancellation information on at least some of the items included in the order after the delivery of the customer's order request is completed.

Operation S810 is an operation of receiving the delivery completion information from a courier assigned to a delivery job (e.g., the courier 200 in FIG. 1) in response to an order request. The courier may perform an input stating that the delivery has been completed for the assigned order on a page provided through the program. When the electronic device (e.g., the electronic device 100 of FIG. 1) receives the delivery completion information, it may confirm that the delivery of the order has been completed, and may change the status 311 from the state 'in progress' to the state 'completed' to provide the information corresponding thereto to the customer (e.g., the customer 300 of FIG. 1).

Operation S820 is an operation of confirming the information on the amount of money of the canceled item among the updated order money amount information. The electronic device may acquire the information on the cancellation of the customer's order request after the delivery is completed. When the customer requests a partial cancellation after the delivery is completed, the electronic device confirms the money amount information through the value of the item requested for a cancellation.

Operation S830 is an operation of checking whether the amount of money of the item canceled by the cancellation request after the completion of delivery is equal to or greater than a predetermined amount or money. The predetermined amount of money may be changed according to the policy of the platform, and the amount of money may not be explicitly displayed. Specifically, it can be determined so that a partial cancellation input by the customer can be possible after the delivery is completed, only when the amount of money for the canceled item on the program is equal to or greater than the predetermined amount of money. More specifically, if the amount of money for the canceled item on the program is less than the predetermined amount of money, the area on which the partial cancellation input is performed may be deactivated or it is possible to provide the information that the partial cancellation input is restricted.

Operation S840 is an operation of assigning a courier to the delivery job for the canceled item. In an embodiment, the delivery job for the canceled item may include a job for collecting the canceled item to the store. For example, the electronic device may provide the courier with the information on a collecting request for an item for which a partial cancellation request has been obtained by confirming that the amount of money for the canceled item is equal to or greater than the predetermined amount of money in operation S830. Allocating the courier in operation S840 may be similar to the courier assignment in operations S710 to S730 of FIG. 7, and an additional algorithm may be added. Specifically, the electronic device may perform the assignment of operation S840 based on the idle state information of the couriers and the status information on returning to the store corresponding to the order request of the couriers. More specifically, the electronic device may provide the information of a collecting request for a canceled item to the couriers who are in idle state among the couriers and the couriers returning to the store, and may assign the delivery job of collecting to any one of them. The couriers in idle state may be resting couriers because they are not assigned to a delivery job. The couriers returning to the store may be couriers returning to another store as well as the store corresponding to the order. Operation S850 is an operation of collecting the canceled item after completing the delivery of the order request. Meanwhile, in the embodiment, the courier that collects the canceled item may be selected from the idle couriers or from the couriers adjacent to the area, in which the to-be-collected item is located, among the couriers performing other delivery job. Meanwhile, in the embodiment, whether to collect the item may be determined based on the characteristics of the item. For example, the collection may not be performed for an item with a high probability of deterioration. Meanwhile, in the embodiment, the electronic device may confirm the information of a customer who has performed the cancellation, and may limit the activity of the customer in a service based on the cancellation history.

Figure 9:
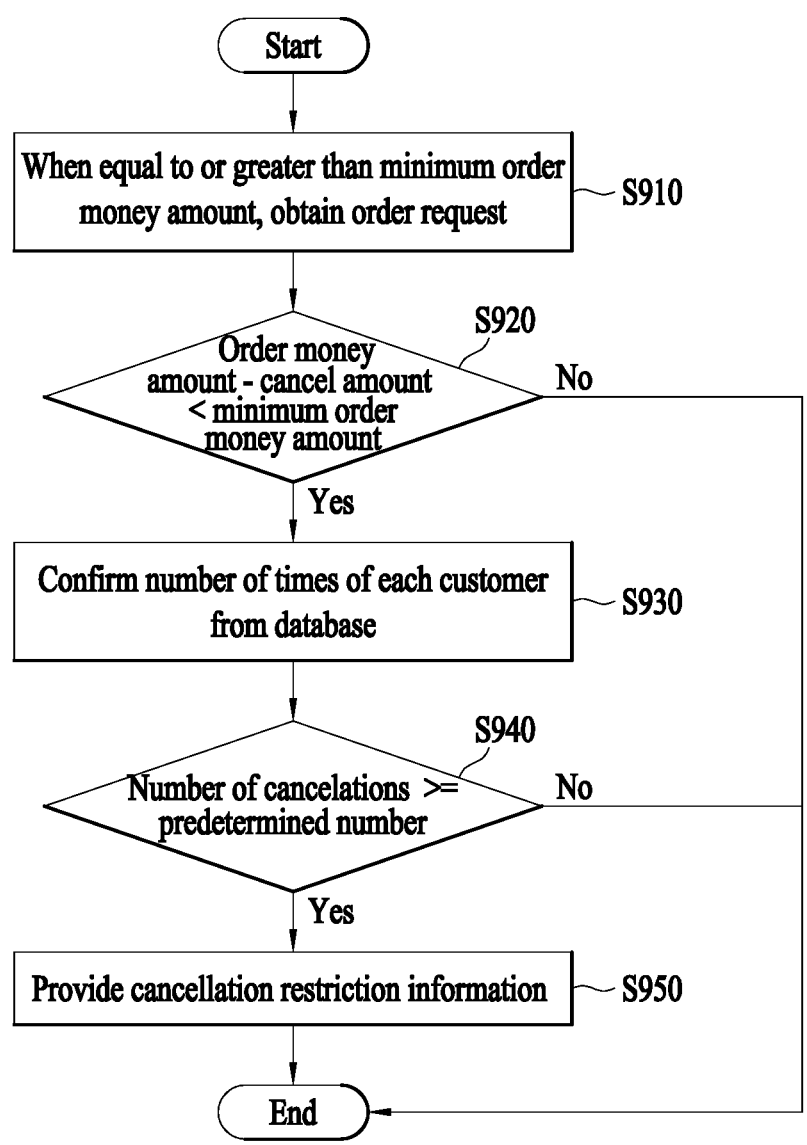
FIG. 9 is a schematic flowchart of an item collecting according to a cancel amount of money after delivery is completed according to various embodiments of the present disclosure.

FIG. 9 is a schematic flowchart of the item collecting according to a cancel amount of money after the delivery is completed according to various embodiments of the present disclosure.

FIG. 9 may be a flow in which a cancellation request of a part of items for an order is limited after the items are delivered according to the order request of a customer (e.g., the customer 300 of FIG. 1).

Operation S910 is an operation in which the order request is obtained when the total amount of money of items ordered by the customer is equal to or greater than the minimum order money amount. For example, a minimum order money amount may be determined when a customer requests an order on a program. If the minimum order money amount is 20,000 won, the customer must request an order value of 20,000 won or more for one order in order to make to the order possible.

Operation S920 is an operation of confirming whether the amount of money excluding the cancel amount of money from the order money amount is less than the minimum order money amount. The electronic device (e.g., the electronic device 100 of FIG. 1) may confirm whether an amount of money excluding the amount of money requested for cancellation from the amount of money requested by the customer is less than the minimum order money amount. An amount of money excluding the amount of money requested for cancellation from the amount of money requested for the order may correspond to the amount of money of items actually purchased by the customer in the order request. For example, if a customer makes an order request for a first item and a second item and requests a cancellation for the second item after the delivery of the items is completed, the amount of money excluding the requested amount of money for cancellation from the amount of money requested for an order may be an amount of money for the first item. The electronic device may confirm the number of times by counting it for which an amount of money excluding a cancel amount of money from an order money amount for each customer who is a member of the platform is less than the minimum order money amount. In addition, the electronic device may classify the counted number for each customer and store it in the database. As shown in operation S920, through the confirmation of the amount of money and the number of times, it can be confirmed that, as a result, an order for an amount of money lower than the minimum order money amount is made, and the customer who abuses it can be confirmed. The electronic device may confirm the abuse according to the customer's order request and cancellation request so that the electronic device may restrict it and perform a normal operation and management of the platform.

Operation S930 is an operation of confirming the number of the cancellation requests for each customer from the database of the electronic device. The electronic device may perform classification by a customer and confirm the number of cancellation requests stored in the database. The number of cancellation requests stored in the database may be the number of cancellation requests that finally result in an order less than the minimum order money amount.

Operation S940 is an operation of confirming the customer for which the number of times of requesting a cancellation, which finally results in an order less than the minimum order money amount, is equal to or greater than a predetermined number. The electronic device may compare the number of cancellation requests for each customer stored in the database with a predetermined number. For example, the electronic device may confirm that the number of cancellation requests of the first customer is three and may determine that the number of cancellation requests is equal to the predetermined number. However, the predetermined number may be arbitrarily determined according to the platform's policy and may not be stated explicitly.

Operation S950 is an operation of providing the information on limiting a cancellation when the number of cancellation requests for each customer is equal to or greater than a predetermined number. If the number of cancellation requests from the customer is confirmed to be equal to or greater than the predetermined number, the electronic device may provide the information indicating that the cancellation request is impossible on the first page (e.g., the first page 310 of FIG. 3) after the customer's order is completed. Specifically, the electronic device may not allow the cancellation requests any more for a customer whose number of cancellation requests, which finally results in an order less than the minimum order money amount after the order completion, is equal to or greater than a predetermined number. The electronic device may identify and prevent the customers who abuse some cancellation requests.

Figure 10B:
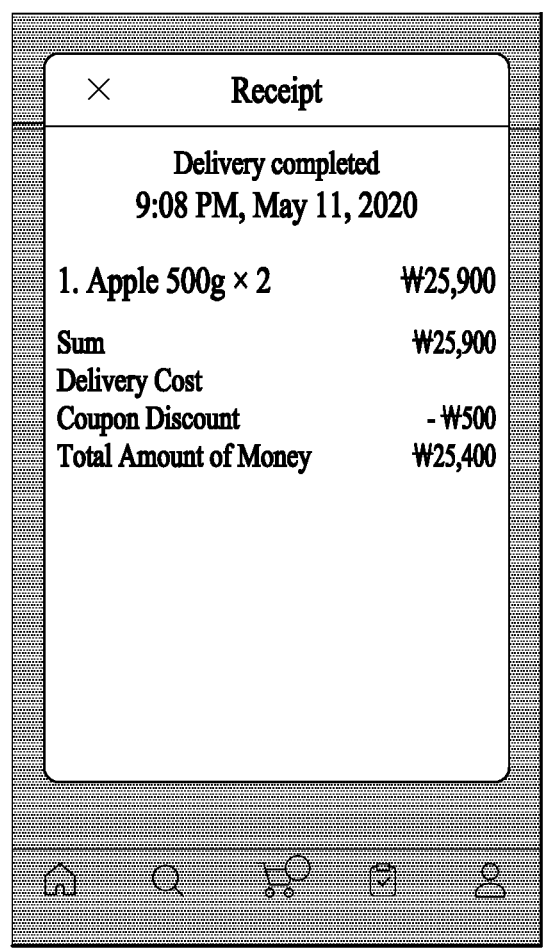

FIGS. 10A and 10B are exemplary diagrams of the information provided after the delivery of an order is completed according to various embodiments of the present disclosure. FIG. 10A may be the information provided after the completion of delivery corresponding to FIG. 6A, and FIG. 10B may be the information provided after the completion of delivery corresponding to FIG. 6B.

The electronic device (e.g., the electronic device 100 of FIG. 1) may synthesize the information on an order request of customer (e.g., the customer 300 of FIG. 1) and a partial cancellation made on the platform, and provide it after the delivery is completed. FIGS. 10A and 10B may correspond to examples showing the above. The electronic device may provide the information after the completion of delivery after the order request to the customer in the form of a history for a predetermined period of time, and the predetermined period of time may be one month. The electronic device may store the information about a customer's order request and a partial cancellation in a database, and through this, the information about the customer's activity on the platform and the information on preference for items, etc. may be confirmed. The customer-specific information accumulated in the database may be later used to recommend items through the electronic device, and may be optimized for each customer and used to preferentially provide the information that meets needs.

Figure 11:
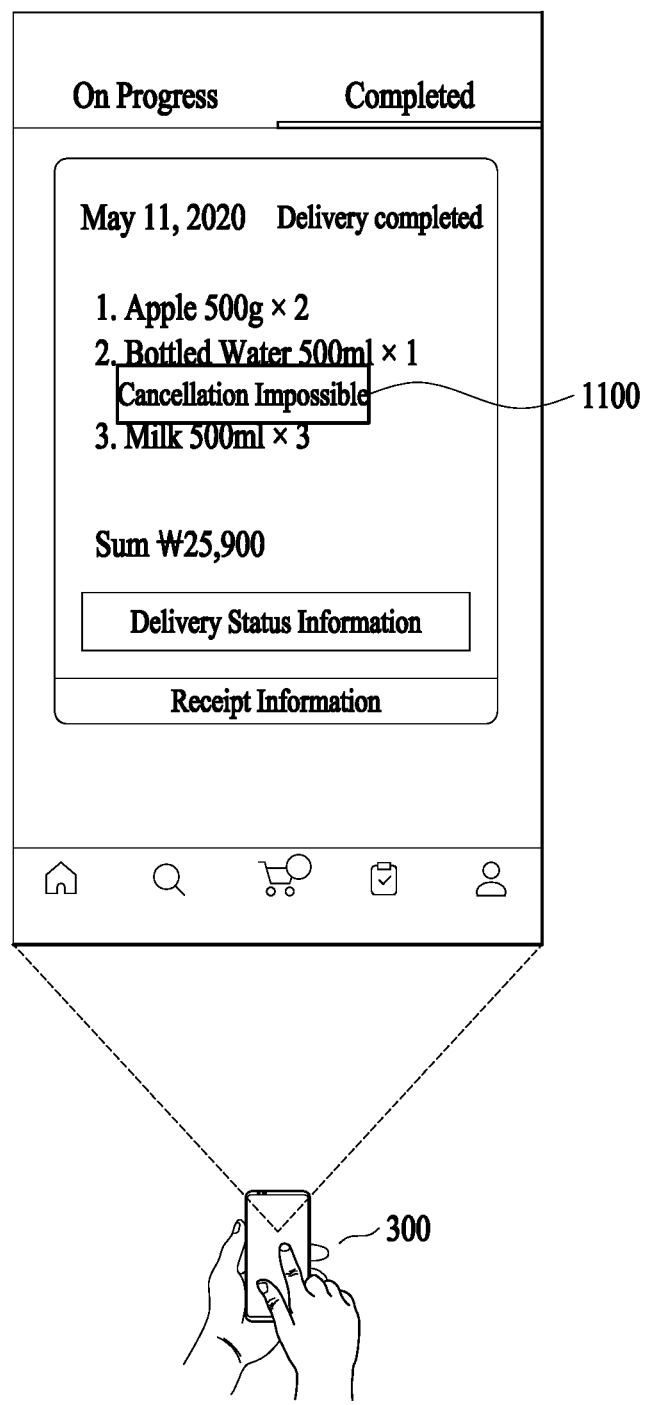
FIG. 11 is an exemplary diagram of cancellation restriction information provided after a delivery is completed according to various embodiments of the present disclosure.

FIG. 11 is an exemplary diagram of the cancellation restriction information provided after the delivery is completed according to various embodiments of the present disclosure.

The example of FIG. 11 may be about the first page (e.g., the first page 310 of FIG. 3) provided to the customer (e.g., the customer 300 of FIG. 1) in a state exceeding the predetermined number of times in the flow of FIG. 9.

Cancellation restriction information 1100 provided on the first page is not provided to all customers using the platform. The cancellation restriction information 1100 is provided to the customer in FIG. 9, in which the number of times of requesting the cancellation, which finally results in an order less than the minimum order money amount, is equal to or greater than a predetermined number. When the customer with the number of times equal to or greater than the predetermined number attempts a cancellation request for an order that has been delivered, for example, the cancellation restriction information 1100 may be provided. For another example, the customer with the number of times equal to or greater than the predetermined number may be switched to the delivery completion tab of the first page and simultaneously displayed with the cancellation restriction information 1100.

According to various embodiments, the customer to whom the cancellation restriction information 1100 is provided may not be permanently restricted from canceling on the platform. The electronic device counts the number of times shown in FIG. 9 by setting a predetermined period, and may delete the number of times counted for each customer after the predetermined period has elapsed. In addition, a partial cancellation request after the completion of delivery may be possible only within a predetermined time after the delivery is completed, and the predetermined time may be set according to the policy in the platform. The customer may perform a cancellation request through partial cancellation request buttons provided for a predetermined period of time, and the button may be set to be inactive or disappear after a predetermined period of time.

A method of providing information in an electronic device according to various embodiments of the present disclosure may include obtaining an order request from a customer, displaying an item list information, order progress information and order money amount information on a first page based on the order request, obtaining information on a partial cancellation of the order request, and updating and displaying the item list information and the order money amount information on the first page based on the information on the partial cancellation.

In the method of providing information in an electronic device according to various embodiments of the present disclosure, the item list information may include cancellation reason information on a canceled item.

In the method of providing the information in an electronic device according to various embodiments of the present disclosure, the updated item list information may include the replacement item list information.

In the method of providing information in an electronic device according to various embodiments of the present disclosure, the information on the partial cancellation may be obtained based on at least one of the inventory information of a store corresponding to the order request and the cancellation request of the customer.

In the method of providing information in an electronic device according to various embodiments of the present disclosure, the first page may further include an estimated delivery time information determined based on the picking information of a store corresponding to the order request and the location information of a courier assigned in response to the order request.

The method of providing information in an electronic device according to various embodiments of the present disclosure may further include assigning a courier corresponding to the order request. Information on the items to be collected may be provided to the assigned courier based on the information on the partial cancellation when the information on the partial cancellation is obtained during a delivery of the assigned courier.

The method of providing information in an electronic device according to various embodiments of the present disclosure may further include obtaining a selection input of the customer for a first area of the first page, and providing delivery status information on a second page in response to the selection input. The delivery status information may include at least one of delivery location information of a courier assigned in response to the order request, registration information of a courier assigned in response to the order request, estimated delivery time information, the order progress information, delivery destination information, the item list information, cancellation reason information and the order money amount information.

The method of providing information in an electronic device according to various embodiments of the present disclosure may further include obtaining a selection input of the customer for a second area of the first page and providing receipt information on a third page in response to the selection input. The receipt information may include at least one of time information in which the order request was obtained, the item list information, canceled item list information, and the order money amount information.

The method of providing information in an electronic device according to various embodiments of the present disclosure may further include receiving location information of a plurality of couriers and obtaining location information of a store corresponding to the order request. A courier assigned in response to the order request may be a courier that is not assigned to a delivery job when the order is requested among couriers located within a predetermined distance from the location of the store corresponding to the order request based on the received location information.

The method of providing information in an electronic device according to various embodiments of the present disclosure may further include receiving delivery completion information from a courier assigned in response to the order request and confirming the amount information on the canceled items of the updated order money amount information based on the partial cancellation information. The information on the partial cancellation may be obtained after the completion of the delivery.

The method of providing information in an electronic device according to various embodiments of the present disclosure may further include allocating a courier to a collection job for the canceled item when the amount of money for the canceled item is equal to or greater than a predetermined amount of money.

In the method of providing information in an electronic device according to various embodiments of the present disclosure, the courier assigned to the collection job for the canceled item may be determined based on at least one of an idle state information of the couriers and the status information returning to a store corresponding to the order request. A courier having the comeback-to-store status information may be assigned to the collection job based on the location information of the courier.

In the method of providing information in an electronic device according to various embodiments of the present disclosure, the obtaining of the order request may include obtaining the order request when the order money amount is equal to or greater than the minimum order money amount.

The method of providing information in an electronic device according to various embodiments of the present disclosure may further include confirming the number of times that an amount of money excluding the cancel amount of money from the order money amount by the information on the partial cancellation is less than the minimum order money amount, and classifying the number of times by each customer to store in a database.

The method of providing information in an electronic device according to various embodiments of the present disclosure may further include confirming the number of times of the customer from the database and providing the information restricting the partial cancellation of the customer on the first page if the number of times of the customer is equal to or greater than the predetermined number.

An electronic device according to various embodiments of the present disclosure includes a database and a processor. The processor may obtain an order request from a customer, display an item list information, order progress information and order money amount information based on the order request on a first page, obtain information on a partial cancellation of the order request, and update and display the item list information and the order money amount information based on the information on the partial cancellation on the first page.

A non-transitory computer-readable storage medium according to various embodiments of the present disclosure includes a medium configured to store computer-readable instructions. The computer-readable instructions, when executed by a processor, may allow the processor to perform a method of providing an information in an electronic device including obtaining an order request from a customer, displaying item list information, order progress information and order money amount information on a first page based on the order request, obtaining information on a partial cancellation of the order request, and updating and displaying the item list information and the order money amount information based on the information on the partial cancellation on the first page.

The present specification and drawings have been described with respect to the embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

The electronic device or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method of reformatting an item list as displayed via a first graphical user interface (GUI) of a first client device, the method comprising:
   receiving, by a server from the first client device, an order request for a plurality of items;
   causing, on the first GUI and based on the order request, display of a first page with functional regions comprising:
      a first functional region displaying order progress information;
      a second functional region displaying order money amount information; and a third functional region displaying an item list comprising a plurality of item descriptions, wherein each item description, of the plurality of item descriptions, corresponds to a respective item of the plurality of items;

sending, to a second client device associated with a specific courier and via a second GUI, a request to deliver the plurality of items in the order request;

receiving, from the first client device before the delivery is completed and via interaction with one of the functional regions, a partial cancellation of the order request that identifies one or more canceled items of the plurality of items;

automatically modifying by reformatting, based on the partial cancellation, the third functional region displaying the item list of the first page by modifying one or more item descriptions, corresponding to the one or more canceled items, on the first page in a first format that differs from a second format in which other item descriptions in the item list are displayed on the first page, wherein the first format comprises a strike-through line;

causing, on the first client device, display of a modified first GUI with the modified third functional region;

sending, to the second client device associated with the specific courier and based on a determination that no item having a possibility of deterioration is included in the one or more canceled items, a request to collect the one or more canceled items while the specific courier is at a destination of the delivery; and causing, on the second GUI, display of a second page indicating the one or more canceled items to be collected by the specific courier.

2. The method of claim 1, wherein the modified third functional region with the item list includes cancellation reason information on a canceled item.

3. The method of claim 1, wherein the modified third functional region with the item list includes replacement item list information.

4. The method of claim 1, wherein information on the partial cancellation is obtained based on at least one of item inventory information of a store corresponding to the order request or a cancellation request of a customer.

5. The method of claim 1, wherein the first page further includes estimated delivery time information determined based on picking information of a store corresponding to the order request and location information of the specific courier assigned in response to the order request.

6. The method of claim 1, further comprising:
obtaining, via the first GUI, a selection input to a first area of the first page; and
providing, via delivery status information on a third page in response to the selection input,
wherein the delivery status information includes at least one of delivery location information of the specific courier assigned in response to the order request, registration information of the specific courier assigned in response to the order request, estimated delivery time information, the order progress information, delivery destination information, the reformatted item list, cancellation reason information, or the order money amount information.

7. The method of claim 1, further comprising:
obtaining, via the first GUI, a selection input to a second area of the first page; and
providing, via a third GUI comprising a third page, receipt information in response to the selection input,
wherein the receipt information includes at least one of time information at which the order request was obtained, the reformatted item list of the third functional region comprising canceled item list information, or the order money amount information.

8. The method of claim 1, further comprising:
receiving location information of a plurality of couriers;
obtaining location information of a store corresponding to the order request; and
assigning, in response to the order request, the specific courier,
wherein the specific courier is selected from a plurality of couriers who are not currently delivering items among couriers located within a predetermined distance from a location of the store corresponding to the order request based on the received location information.

9. The method of claim 1, further comprising:
receiving delivery completion information from a second courier assigned in response to a second order request; and
confirming amount information on a canceled item among updated order money amount information based on information on a partial cancellation of the second order request,
wherein the information on the partial cancellation is obtained after the delivery is completed.

10. The method of claim 9, further comprising:
assigning a third courier to a collection job fora canceled item in the second order when an amount of money for the canceled item is equal to or greater than a predetermined amount of money.

11. The method of claim 10, wherein the third courier assigned to the collection job for the canceled item is determined based on at least one of idle status information of couriers or comeback-to-store status information corresponding to the order request, and
wherein the third courier assigned to the collection job is a courier being assigned a comeback-to-store status based on location information.

12. The method of claim 1, wherein the receiving of the order request comprises obtaining the order request when the order money amount is equal to or greater than a minimum order money amount.

13. The method of claim 12, further comprising:
determining a number of times that an amount of money excluding an amount of money for the canceled item from the order money amount in the information on the partial cancellation is less than the minimum order money amount; and
classifying, based on the determining, the number of times for each customer and storing a result of the classifying in a database.

14. The method of claim 13, further comprising:
determining, from the database, the number of times of the customer has cancelled an order; and
providing information, based on the determined number of times, for restricting the partial cancellation of the customer on the first page if where the number of times of the customer is equal to or greater than a predetermined number of times.

15. An electronic device, comprising:
a database; and
a processor,
wherein the processor is configured to:
receive an order request for a plurality of items;

cause on a first graphical user interface (GUI) of a first client device and based on the order request, display of a first page with functional regions comprising:
a first functional region displaying order progress information;
a second functional region displaying order money amount information; and
a third functional region displaying an item list comprising a plurality of item descriptions, wherein each item description, of the plurality of item descriptions, corresponds to a respective item of the plurality of items;
send, to a second client device associated with a specific courier and via a second GUI, a request to deliver the plurality of items in the order request;
receive, from the first client device before the delivery is completed and via interaction with one of the functional regions, a partial cancellation of the order request that identifies one or more canceled items of the plurality of items;
automatically modify by reformatting, based on the partial cancellation, the third functional region displaying the item list of the first page by modifying one or more item descriptions, corresponding to the one or more canceled items, on the first page in a first format that differs from a second format in which other item descriptions in the item list are displayed on the first page via, wherein the first format comprises a strikethrough line;
cause, on the first client device, display of a modified first GUI with the modified third functional region;
send, to the second client device associated with the specific courier and based on a determination that no item having a possibility of deterioration is included in the one or more canceled items, a request to collect the one or more canceled items while the specific courier is at a destination of the delivery; and
cause, on the second GUI, display of a second page indicating the one or more canceled items to be collected by the specific courier.

16. A non-transitory computer-readable storage medium comprising:
a medium configured to store computer-readable instructions, wherein when the computer-readable instructions are executed by a processor, the processor is configured to perform a method of providing information in an electronic device, the method comprising:
receiving an order request for a plurality of items;
causing, on a first graphical user interface (GUI) of a first client device and based on the order request, display of a first page with functional regions comprising:
a first functional region displaying order progress information;
a second functional region displaying order money amount information; and
a third functional region displaying an item list comprising a plurality of item descriptions, wherein each item description, of the plurality of item descriptions, corresponds to a respective item of the plurality of items;
sending, to a second client device associated with a specific courier and via a second GUI a request to deliver the plurality of items in the order request;
receiving, from the first client device before the delivery is completed and via interaction with one of the functional regions, a partial cancellation of the order request that identifies one or more canceled items of the plurality of items;
automatically modifying by reformatting, based on the partial cancellation, the third functional region displaying the item list of the first page by modifying one or more item descriptions, corresponding to the one or more canceled items, on the first page in a first format that differs from a second format in which other item descriptions in the item list are displayed on the first page, wherein the first format comprises a strikethrough line;
causing, on the first client device, display of a modified first GUI with the modified third functional region;
sending, to the second client device associated with the specific courier and based on a determination that no item having a possibility of deterioration is included in the one or more canceled items, a request to collect the one or more canceled items while the specific courier is at a destination of the delivery; and
causing, on the second GUI, display of a second page indicating the one or more canceled items to be collected by the specific courier.

* * * * *